May 18, 1926.
C. E. HATHORN
CLAMP
Filed March 20, 1925
1,584,935
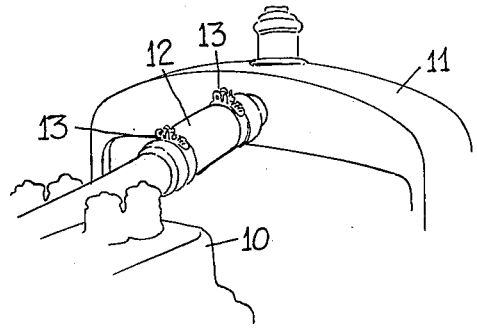
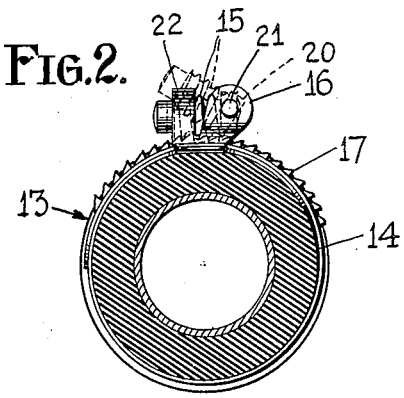
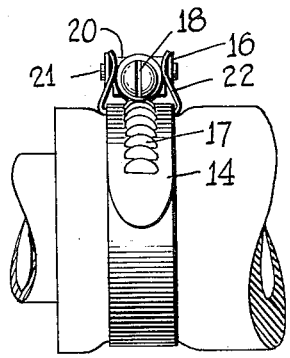
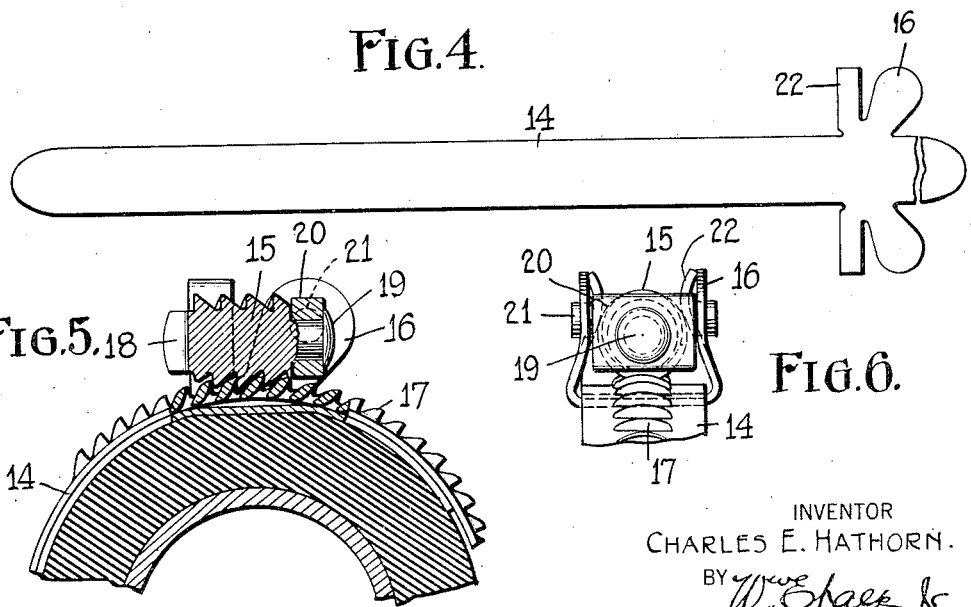
INVENTOR
CHARLES E. HATHORN.
BY
ATTORNEY Patented May 18, 1926.

1,584,935

UNITED STATES PATENT OFFICE.

CHARLES E. HATHORN, OF HEMPSTEAD, NEW YORK.

CLAMP.

Application filed March 20, 1925. Serial No. 16,885.

My invention relates to clamps and is concerned more particularly with a type of hose clamp comprising a tough flexible clamping band, the ends of which are adapted to be acted upon by a freely rotatable operating or clamping screw.

An object of the invention is to provide an operating screw which, in addition to being freely rotatable, is pivotally mounted and is adapted, in the use of the clamp, to be moved bodily either into or out of operative engagement with a cooperating part or portion of the clamp.

A further object of the invention is to so mount the operating or clamping screw as to increasingly more and more firmly establish operative engagement between it and said cooperating clamp portion by merely tightening the screw.

A still further object of the invention is the provision of a clamp which is inexpensive to manufacture, which is positive and certain in operation, which is easily applied and removed, which, by reason of a wide range of adjustment, can be used in connection with both large and small diameter hose, and which embodies in its construction no loose or disjointed parts likely to fall off or be lost either in applying the clamp or while in use.

In the drawings, wherein like reference characters denote like or corresponding parts:

Fig. 1 is a perspective view of an automobile power plant illustrating a common use for hose clamps;

Fig. 2 is an elevation of the clamp of the present invention, the hose to which clamp is applied, being shown in section;

Fig. 3 is an edge view of the clamp further illustrating its application;

Fig. 4 is a plan view of one of the stampings constituting the metallic clamp band;

Fig. 5 is an enlarged detail sectional view showing the relative arrangement of the clamping screw and band, and Fig. 6 is an end view of the structure illustrated in Fig. 5.

In the embodiment of the invention selected for illustration, 10 designates an automobile power plant and 11 the radiator thereof. Usually, in connection with the cooling system of such power plant a flexible hose 12 is provided, said hose 12 affording a suitable connection between the power plant 10, per se, and the radiator 11. For the purpose of sealing the ends of the hose connection 12, clamps 13 are provided. Two of such clamps are herein illustrated.

Preferably, the clamp 13 comprises a tough flexible metallic band 14 and an operating or clamping screw 15 permanently fastened to it, the latter being mounted between ears 16 formed on the band 14 adjacent to one end thereof. Said ears 16 are spaced apart a distance approximately equal to the width of the band and in the embodiment of the invention herein illustrated are formed integrally with the band; being bent upwardly or away from the band at substantially a right angle. Adjacent to the opposite end of the band from that upon which the ears 16 are formed, said band is provided with circumferentially spaced teeth 17 throughout a considerable portion of its length, such toothed or threaded portion, in the application of the clamp, being extended between the ears 16 in over-lapping relation to that portion of the band upon which said ears are formed. Thus positioned, thru the operation of the clamping screw 15, the band may be contracted or expanded as required.

The operating screw 15 is pivotally mounted. At one end it is provided with a slot 18 for a screw-driver (a screw-driver being preferably used to tighten or loosen the screw), and at its opposite end it is provided with a head portion 19 having a swivel connection with a disc 20 pivotally supported by trunnions 21 respectively engaging in the ears 16. Thus mounted, the operating screw 15 is freely rotatable and is at the same time bodily movable about an axis defined by the trunnions 21 into and out of operative or threaded engagement with the teeth 17 of the band. Preferably, the teeth 17 are struck up or out from the band 14, said teeth being so formed as to mesh perfectly with the teeth of the operating screw, and since the teeth of the operating screw 15 are straight sided, obviously, firm threaded contact is maintained between the screw and band the moment the former is tightened. As a further aid in maintaining such firm threaded contact, the pivot axis of said screw 15 is offset rather appreciably with respect to its axis of rotation, said axis being spaced away from the teeth 17 a greater distance than is the axis of rotation of the screw. Thru such an arrangement, a tendency is created to firmly bind the screw and band together as the latter is tightened on the hose.

In the manufacture of the clamp the band 14 and the ears 16 are formed from flat stock material, the teeth 17 being struck up and the ears 16 bent up after the band is stamped. Being thus produced, the manufacturing cost of the clamp is small.

As a further retaining means for the screw 15, spring arms 22 may be provided adjacent to the ears 16, said arms 22 being so shaped (see Fig. 3) as to frictionally engage and hold the screw 18 in contact with the band when once such contact is established. In the operation of the clamp the threaded end 17 of the band is placed in circumferentially extended over-lapping engagement with the opposite end thereof, such overlapping threaded end being carried beneath and beyond the screw supporting disc 20 mounted on the under-lapping end of the band. In thus positioning the threaded band end, the operating screw 15 may assume that position illustrated by dotted lines in Fig. 2. With the ends of the clamp band in lapping engagement, the screw 15 is then bodily swung from the dotted line position to the full line position indicated in Fig. 2, in which position operative contact is established between the teeth of the screw and the teeth of the band. Such contact having been established, three things tend to hold the said teeth in engagement. First, the character of teeth provided tends to prevent an accidental withdrawal of the screw 15 from its operative position; secondly, the offset axis of the screw 15 tends to maintain such contact since the over-lapping band end is supported from beneath by the under-lapping portion thereof, and thirdly, the spring arms (if provided) further tend to hold the screw in that position described as operative. Especially important is the offset axis since it has been found in practice that this alone, as the screw is tightened, provides a positive means for holding the screw in the desired threaded position with respect to the teeth 17. To release the clamp it is but necessary, after loosening the screw, to elevate the screw until the teeth of the band and screw are disengaged. This may be done by forcing a tool beneath the free end of the screw.

A hose clamp characterized as above set forth, is positive in its operation; it can be manufactured at little cost; and in operation is extremely simple since the only tool required to operate the clamp is a screwdriver and there are no nuts or other loose parts likely to be lost or fall off either in attempting to apply the clamp or as a result of vibration during use. Moreover, such a clamp may be used upon hose of both large and small diameter due to the wide range of adjustment provided.

Obviously a clamp characterized as above set forth can be advantageously used in connection with other articles or apparatus than hose; such for instance as barrels, vats, forms, etc.; in fact, on or in connection with any and all apparatus so formed or constructed as to have associated with it a tightening band or clamp.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. A clamp including a metallic band provided with teeth, and a freely rotatable clamping screw permanently fastened to said band and movable bodily relatively thereto into and out of threaded engagement with said teeth.

2. A clamp including a metallic band provided with teeth adjacent to one end thereof and a pivotally mounted freely rotatable clamping screw carried by said band adjacent to its opposite end, said screw being movable bodily about its pivot axis into and out of threaded engagement with said teeth.

3. A clamp including a metallic band provided with teeth, and a pivotally mounted, freely rotatable clamping screw movable into and out of engagement with said teeth, the pivot axis of said clamping screw being offset with respect to its axis of rotation.

4. A clamp including a metallic band provided with teeth adjacent to one end thereof, a pivotally mounted, freely rotatable clamping screw carried by said band adjacent to its opposite end, said screw being movable bodily about its pivot axis into and out of engagement with said teeth, and means to yieldingly maintain such threaded engagement when once established.

5. A clamp including a metallic band provided with teeth, a freely rotatable clamping screw movable bodily about a fixed pivot axis into and out of threaded engagement with said teeth, the relative arrangement of the pivot axis and the axis of rotation of said screw being such that a tightening of the screw tends to more firmly establish such threaded engagement between said screw and said teeth.

6. A clamp including a metallic band, and a clamping screw mounted adjacent to said band, and movable bodily about a fixed pivot axis into and out of engagement therewith, said screw, when in engagement with said band, being freely rotatable to draw the ends of said band together and said pivot axis being offset with respect to the axis of rotation of said screw whereby a tightening of the screw tends to firmly hold the band and screw together.

7. A clamp including a metallic band having teeth formed thereon throughout a portion of its length adjacent to one end thereof, ears formed upon said band adjacent to its opposite end and between which the threaded end of said band is adapted to extend, a clamping screw pivotally mounted between said ears and movable bodily into and out of threaded engagement with said teeth, said screw being freely rotatable, when in engagement with said teeth, to draw the ends of said band together, and said pivot axis being offset with respect to the axis of rotation of said screw.

8. A clamp including an encircling metallic band, the opposite ends of which are adapted, in the operation of the clamp, to lap one upon the other, a clamping screw carried by the under-lapping portion of the band and beneath which the over-lapping portion of the band extends, and threads formed upon said over-lapping band portion for cooperation with said teeth, the threads, in at least one instance, being buttress threads.

9. A clamp including an encircling metallic band, the opposite ends of which are adapted, in the operation of the clamp, to lap one upon the other, a clamping screw carried by the under-lapping portion of the band and beneath which the over-lapping portion of the band extends, and buttress threads formed upon said over-lapping band portion for cooperation with said screw, the angular faces of said threads being inclined upwardly and backwardly and away from that end of the band extended beneath said screw.

10. A clamp including an encircling metallic band, the opposite ends of which are adapted, in the operation of the clamp, to lap one upon the other, a pivotally mounted clamping screw carried by the under-lapping portion of the band and provided with buttress threads beneath which the over-lapping portion of the bands extends, the angular faces of said threads being presented toward the pivot axis of said screw, and threads formed upon said over-lapping band portion for cooperation with the buttress threads of said clamping screw.

In testimony whereof I hereunto affix my signature.

CHARLES E. HATHORN.